United States Patent [19]

Greefkes et al.

[11] 3,823,376

[45] July 9, 1974

[54] TRANSMITTER FOR THE TRANSMISSION OF ANALOGUE SIGNALS BY PULSE CODE

[75] Inventors: Johannes Anton Greefkes, Emmasingel, Eindhoven; Jan Korevaar Geerlof, Hilvesum, both of Netherlands

[73] Assignee: U.S. Philips Corporation, New York, N.Y.

[22] Filed: Mar. 19, 1973

[21] Appl. No.: 342,447

Related U.S. Application Data

[63] Continuation of Ser. No. 120,542, March 3, 1971, abandoned.

[52] U.S. Cl. .................................. 325/141, 328/168

[51] Int. Cl. .............................................. H04b 1/04

[58] Field of Search.... 179/15 AV; 325/38 R, 38 A, 325/38 B, 41–44, 46, 62, 141; 328/168, 171

[56] References Cited

UNITED STATES PATENTS 3,414,818 12/1968 Reidel................................ 325/141

*Primary Examiner*—Albert J. Mayer
*Attorney, Agent, or Firm*—Frank R. Trifari; Simon L. Cohen

[57] ABSTRACT

Pulse code modulation transmitter including an instantaneous dynamic control device having a segment-shaped control characteristic, in which the successive amplitude values are converted into codegroups in a first analog-to-digital converter and the different segments of the control characteristic being characterized by codegroups in a second analog-to-digital converter in order to considerably reduce the accuracy requirements in their form, A test circuit is connected to the first analog-to-digital converter formed with an enlarged coding range for the purpose of testing the pulse having the greatest weight and a correction device controlled by the test circuit is coupled for the purpose of correcting codegroups to both the first and the second analog-to-digital converter.

9 Claims, 4 Drawing Figures

INVENTORS
JOHANNES A. GREEFKES
GEERLOF J. KOREVAAR

BY

AGENT

INVENTORS
JOHANNES A. GREEFKES
GEERLOF J. KOREVAAR

BY [signature]

AGENT

TRANSMITTER FOR THE TRANSMISSION OF ANALOGUE SIGNALS BY PULSE CODE

This is a continuation of application Ser. No. 120,542, filed Mar. 3, 1971 now abandoned.

The invention relates to a transmitter for the transmission of analogue signals by pulse code modulation. The transmitter comprises a first analogue-digital converter, which converts at consecutive instants the amplitude values of the analogue signal within its code range into code groups having a number of pulses of different weights, which characterize the amplitude values of the analogue signal by the logical values "0" and "1", and the transmitter further comprises, for dynamic compression, a dynamic control governed by the instantaneous value of the analogue signal and having a segment-shaped control curve and being connected to the input of the first analogue-digital converter. The second analogue-digital converter is used so that the various segments of the segment-shaped control characteristic curve are characterized by code groups formed by pulses having logical values 0 and 1. The code groups of the first and second analogue-digital converters are transmitted in common.

It is known that pulse code modulation transmission is mainly performed by two methods of transmission. In one method, the weights of the consecutive pulses of a code group decrease by a weight factor 2 and in the other method the weights of the consecutive pulses of a code group increase by a weight factor 2. For example, the consecutive pulses of code groups of five pulses in the first transmitting method characterize, in code units, E, a signal value of $2^4E$, $2^3E$, $2^2E$, $2^1E$ and $2^0E$ respectively, whereas in the second transmitting method the consecutive pulse characterize a signal value of $2^0E$, $2^1E$, $2^2E$, $2^3E$ and $2^4E$ respectively. In the first transmitting method, a signal value of 24E is characterized by two 1 pulses for the first two pulses and in the second transmitting method by two 1 pulses for the last two pulses.

In the practical embodiment of a transmitter of the kind set forth for pulse code modulation with non-linear coding, particular attention must, be given to the accuracy of the adjustment of the dynamic control with the segment-shaped control curve, since in restoring the analogue signals at the receiver an incorrect adjustment introduces non-linear distortions. A correct adjustment of the dynamic control gives rise to serious difficulties if the amplitude value of the analogue signal approaches the amplitude value given by the point of intersection of two consecutive segments of the segment-shaped control curve.

The invention has for its object to provide a novel design of a transmitter of the kind set forth, in which the requirements of accuracy are appreciably reduced so that the transmitter is particularly suitable for integration in a semiconductor body.

The transmitter according to the invention is characterized in that the first analogue-digital converter having an enlarged coding range is connected to a test circuit which tests the pulse of the highest weight in each of the consecutive code groups for producing a test signal in accordance with the logical value 0 or 1 of said pulse and in that both with the first and with the second analogue-digital converter a correction device is coupled, which is controlled by the test signal of the test circuit for correcting the transmitted code groups of the first and second analogue-digital converters.

The invention and its advantages will now be described more fully with reference to the Figures.

Figure 1:
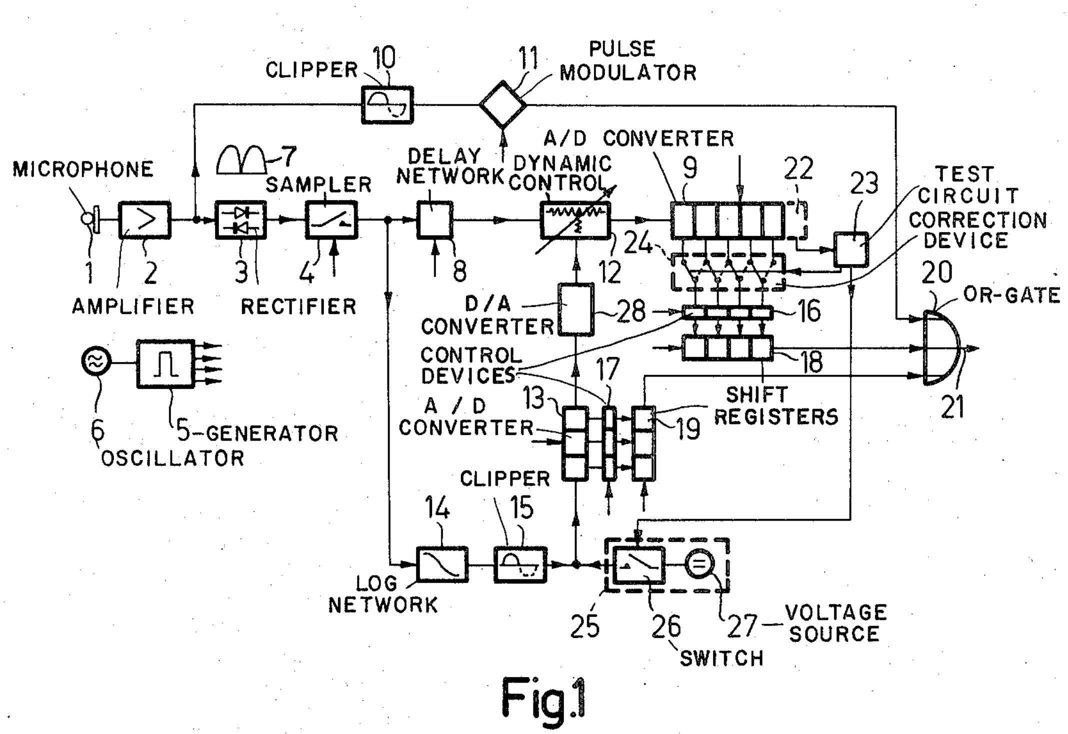
FIG. 1 shows a block diagram of a transmitter embodying the invention and FIG. 2 illustrates the control characteristic curve of the dynamic control employed for explaining the transmitter of FIG. 1.

In the pulse code modulation transmitter shown in a block diagram in FIG. 1 the speech signals in the band from 300 to 3,400 Hz derived from a microphone 1 are applied, subsequent to amplification in a low-frequency amplifier 2, to a full-wave rectifier 3 for producing a full-wave rectified speech signal. The full-wave rectifier 3 is followed by a sampling device 4, which is controlled in the rhythm of the code groups to be produced, for example, with a frequency of 8 kHz, by pulses from a control-pulse generator 5, which is synchronized by a master oscillator 6. For the sake of clarity, FIG. 1 shows by the curve 7 the output signal of the full-wave rectifier 3.

In the arrangement shown, the signal values derived from the output of the sampling device 4 are supplied through a delay network 8 to an analogue-digital converter 9, which converts the signal values lying within its coding range into code groups having a number of pulses of different weights, which characterize the amplitude values of the analogue signals by their logical values 0 and 1. With analog-digital converter 9 includes a shift register for temporarily storing codes each code group produced by the analogue-digital converter 9, a pulse characteristic of the polarity of the speech signals to be transmitted, briefly termed polarity pulse, is transmitted, said pulse being derived from a polarity detector connected to the low-frequency amplifier 2. These polarity pulses are obtained in the polarity detector comprised of clipper 10 and pulse modulator 11 by applying the speech signal derived from the low-frequency amplifier 2 subsequent to limitation in an clipper 10 to a pulse modulator 11 controlled by the control-pulse generator 5, said modulator indicating a 1 pulse, for example, with positive polarity of the speech signal.

The analogue-digital converter 9 is preceded for dynamic compression by a dynamic control 12 governed by the instantaneous value of the speech signal, for example, formed by an adjustable attenuator having a segment-shaped control-characteristic curve, the various segments of which control-curve are characterized by code groups of 0 and 1 pulses with the aid of a second analogue-digital converter 13 which includes a shift register for temporarily storing a code.

Dynamic control 12 is an analog divider as shown in the "Standard Handbook for Mechanical Engineers", Seventh Edition, McGraw-Hill Book Company, 1952, Library of Congress Catalogue Card No. 16–12915, page 2–108.

Figure 2:
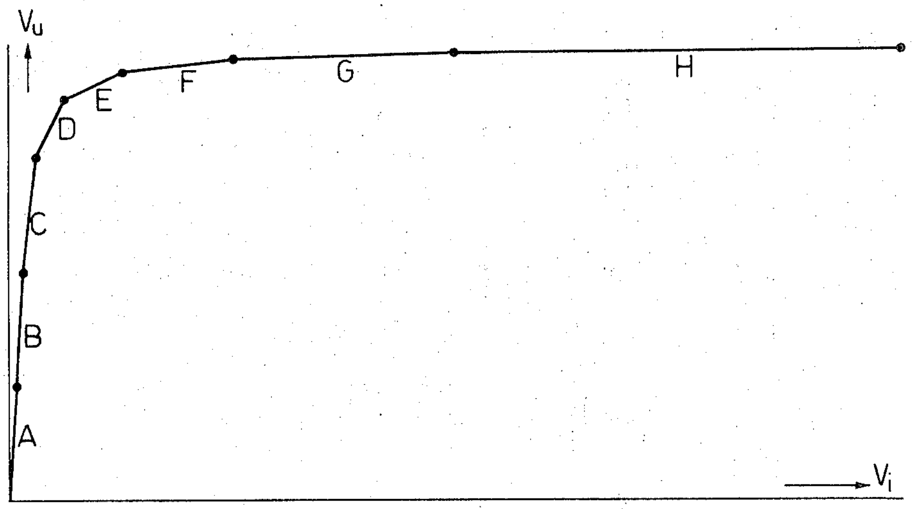

In FIG. 2 the compression characteristic in the pulse code modulation transmitter of such a dynamic control having a segment-shaped control-curve is plotted as a function of the amplitude value of the input signal $V_i$. For practical purposes this control-curve comprising eight segments A, B, C, D, E, F, G, H is fixed by the following Table in accordance with an international proposal.

In this Table, column 1 indicates the segment of the segment-shaped control-curve, column 2 the input signal $V_i$ in coding units E of the analogue-digital converter 9, column 3 the ratio between the degrees of attenuation of the consecutive segments in dB and column 4 said ratio in powers of 2, column 5 the exponents from column 4, column 6 the pulse code transmitted characterizing the exponent of 2 and column 7 the output signal $V_u$ of the adjustable attenuator in coding units E.

| Segm. | Inp. s. $V_i$ | Atten. in dB | Atten. in 2 | Atten. exponent | Atten. code | Outp. s. $V_u$ |
|---|---|---|---|---|---|---|
| A | 0–16 | 0 | $2^0$ | 0 | 000 | 0–16 |
| B | 16–32 | 0 | $2^0$ | 0 | 001 | 16–32 |
| C | 32–64 | 6 | $2^1$ | 1 | 010 | 16–32 |
| D | 64–128 | 12 | $2^2$ | 2 | 011 | 16–32 |
| E | 128–256 | 18 | $2^3$ | 3 | 100 | 16–32 |
| F | 256–512 | 24 | $2^4$ | 4 | 101 | 16–32 |
| G | 512–1024 | 30 | $2^5$ | 5 | 110 | 16–32 |
| H | 1024–2048 | 36 | $2^6$ | 6 | 111 | 16–32 |

From this Table it will be seen that the values of the input signal $V_i$ of the consecutive segments increase by a factor 2 like the associated attenuation coefficients with the exception of the first two segments A and B, where the attenuation is the same, so that the signal values of the output signal $V^u$, with the exception of those of the first segments, are also equal to each other. The transmitted attenuation code characterizes the actual attenuation and hence the associated segment; since the attenuation coefficient is equal to the numerical value indicated by the pulse code minus unity. For example, the segment F is associated with the attenuation code 101, corresponding to the number $1 \times 2^2 + 0 \times 2^1 + 1 \times 2^0 = 5$, so that the attenuation coefficient is $5 - 1 = 4$, which will be apparent from the Table. In transmitting given amplitude values, there is produced together with the code group in the analogue-digital converter 9 the attenuation code which is obtained by applying the sample from the sampling device 4 via a logarithmic amplifier network 14 having a logarithmic characteristic curve and via a clipper 15 to the analogue-digital converter 13, If, for example, the sample has a value of 320 units, the network 14 having the logarithmic characteristic curve supplies the logarithm 0f 320 with the base 2, corresponding to the number 8.42 and by subtracting three units in the clipper 15 the number 5.42 is obtained, which is converted in the analogue-digital converter 13 into the attenuation code 101.

If, therefore, an amplitude value of 320 coding units has to be transmitted, the attenuation of the dynamic control 12 is adjusted in a manner to be described hereinafter to an attenuation factor $2^4$, the analogue-digital converter 13 producing the attenuation code 101, while the amplitude value $320/2^4 = 20$, appearing at the output of the dynamic control 12 is converted in the analogue-digital converter 9 into the code group 10100, so that the amplitude value of 320 coding units is characterized by the attenuation code 101 and the code group 10100 from the analogue-digital converter 9. Since, in accordance with the Table, the output signal of the dynamic control 12 with the exception of segment A is characterized by the attenuation code 000, and comprises at the further segments B to H at least 16 coding units, the first pulse of the code group of the analogue-digital converter 9 invariably has the logical value 1, so that it may be omitted. Finally, the amplitude value of 320 coding units is transmitted by the attenuation code 101 and the code group 0100 of the analogue-digital converter 9.

For transmitting, the PCM-signals produced in the transmitter as described will correspond to the polarity pulse, the attenuation code, and the code group produced by the analogue-digital converter 9 and are transmitted in order of succession. For this purpose, the elements of the analogue-digital converters 9 and 13 are connected through parallel conductors and bus data interface control-devices 16 and 17 to elements of the shift registers 18 and 19. Control-devices 16 and 17 consist of a series of AND-gates all commonly controlled by a single input line as shown in "The Digital Logic Handbook Flip Chip Modules", 1968 Edition, page 99. For example, at the numerical value of 320 the elements of the analogue-digital converter 9 have, viewed from the output, the logical values 1, 0, 1, 0, 0 and those of the analogue-digital converter 13, also viewed from the output, the logical values 1, 0, 1. After each termination of the coding process the control-devices 16 and 17 are released by pulses from the control-pulse generator 5 and the code groups produced by the analogue-digital converters 9 and 13 are written in the elements of the shift registers 18 and 19, which are shifted in order of succession by shift pulses from the control-pulse generator 5. In order of succession, the pulse from the polarity detector (clipper 10 and pulse modulator 11) and the two analogue-digital converters 9 and 13 are applied through an or-gate 20 to the output conductor 21.

In the pulse-code-modulation transmitter described above, particular attention has to be given to the accuracy of the adjustment of the dynamic control 12 by the instantaneous value of the speech signals to be transmitted. Particularly if the amplitude value approaches the point of intersection of two segments of the segment-shaped control curve, the arrangement described so far requires an accuracy of adjustment of the order of magnitude of one coding unit with 2,048 of potential coding units, which corresponds to an accuracy of 1 : 2,048 or $1 : 2^{11}$.

According to the invention, the difficulty involved in achieving this extremely high accuracy of adjustment is obviated by enlarging the coding range of the first analogue-digital converter 9 by the additional element 22, shown in broken lines, adjacent to the pulse of the highest weight. The additional element 22 is connected a test circuit 23, which tests each time the pulse of the highest weight in the consecutive code groups and produces a test signal in accordance with the logical values 0 and 1 of said pulse. Both the first and the second analogue-digital converters 9 and 13 are coupled to correction devices 24 and 25, which devices are controlled by the test signal of the test circuit 23 for correcting the transmitted code groups of the first and the second analogue-digital converters 9 and 13. The correction device 24 for the first analogue-digital converter 9 is formed by an electronic change-over unit having two positions: in the first position the elements 1 to 4 and in the second position the elements 2 to 5 of the analogue-digital converter 9 are connected through the control-device 16 to the elements of the shift register 18, as is indicated in FIG. 1 by full lines and broken lines respectively. A group of logic circuits that are each the digital equivalent of a single pole double throw switch is shown on page 550 of "Digital Computer and Control Engineering", McGraw-Hill Book Co., Inc., 1960, Library of Congress Catalogue No. 59–15055. The logic circuits will be used by connecting the outputs of the upper group of AND-gates shown on page 550 of the aforementioned book as inputs to correction device 24; by using input $A_3$ as the control input; and by connecting the following paths of output lines to the output lines of the correction device 24: $(B_0, B_5)$, $(B_1, B_6)$, $(B_2, B_7)$. The correction device 24 is therefore the digital equivalent of a five pole double throw switch correction device 25 of the second analogue-digital converter 13 is formed by a correction voltage source 27, connected via a signal controlled switch 26 to the input thereof. The two correction devices 24 and 25 are controlled by the test circuit 23, formed by a switching-pulse generator or flip-flop. The flip-flop in test circuit 23 is a standard flip-flop as shown on page 52 of "The Digital Logic Handbook Flip Chip Modules", 1968 Edition, Digital Equipment Corporation. The flip-flop in test circuit 23 is set by the 1 output of additional element 22 and maintains this state until reset by control-pulse generator 5 (the reset connection is not shown).

In the embodiment shown, the dynamic control 12 is governed by the connection of a digital-analogue converter 28 to the analogue-digital converter 13, said converter 28 converting the incoming code groups into a dynamic control-voltage for the adjustment of the dynamic control 12 to the attenuation corresponding to the pulse code concerned. If, for example, the pulse code produced by the analogue-digital converter 13 is 101, the digital-analogue converter 28 adjusts the attenuation of the dynamic control 12 to $2_4$. By an appropriate structure of the dynamic control-circuit it is ensured that the attenuation code can only be too low so that instead of an attenuation code of, for example, 101 the attenuation code 100 is produced, which corresponds to an attenuation of $2^3$, instead of $2^4$.

Thus, the flip-flop in test circuit 23 retains the state to which it was set by the 1 output of additional element 22 even after the 1 output of element 22 changes due to the change in the output level from dynamic control 12, caused by the application of the correction voltage from correction device 25. Obviously, the flip-flop in test circuit 23 is reset at the end of each sampling period.

If an amplitude value of 320 is applied to the arrangement described so far, the attenuation code 101 will be produced in the event of correct coding in the analogue-digital converter 13 (cf. the Table) and the attenuation of the dynamic control 12 will be adjusted to $2^4$, which results in an amplitude value of $320/2^4 = 20$ lying within the correct amplitude range from 16 to 32 at the output of the dynamic control 12. In the successive elements of the analogue-digital converter 9 the amplitude value 20 is converted into the logical values 00101 and in the additional element 22 a 0 is formed, which means that the output signal of the dynamic control 12 lies in the correct amplitude range from 16 to 32 so that the arrangement is correctly adjusted. In this state, in which the additional element 22 has a 0, no correction occurs. The logical values of the elements 1 to 4 of the first analogue-digital converter 9 are written, in the state of the changeover unit 24 indicated by the full lines, through the control-device 16 in the elements of the shift register 18 and likewise the logical values of the second analogue-digital converter 13 are written through the control-device 17 in the elements of the shift register 19, after which the code groups written in the shift register 18 and 19 are transmitted in order of succession under the control of the control-pulse generator 5. Thus, at the amplitude value of 320 the code 101 written in the shift register 19 and the code 0010 written in the shift register 18 0010 are transmitted one after the other.

Starting again from an initial amplitude value of 320, but this time from a state in which the analogue-digital converter 13 produces the incorrect attenuation code 100, the attenuation of the dynamic control 12 is adjusted to $2^3$ and an amplitude value of $320/2^3 = 40$ lying beyond the correct amplitude range of 16 to 32 will occur at the output of the dynamic control 12, said value being exactly twice the value at the correct adjustment of the attenuation of the dynamic control 12. The amplitude value 40 produces the code group 000101 in the consecutive elements of the analogue-digital converter 9.

It will be apparent that on the one hand the logical value 1 occurs in the additional element 22 — said logical value 1 in the additional element 22 of the analogue-digital converter 9 is the criterion of the incorrect adjustment of the pulse code modulation transmitter — and that on the other hand, shifted by one element, the same code occurs in the analogue-digital converter 9 as with the correct adjustment of the pulse code modulation transmitter, since in the latter case the code formed in the elements of the analogue-digital converter 9 is 001010.

At the appearance of the logical value 1 in the additional element 22 the transmitted code groups of the first and of the second analogue-digital converters 9 and 13 are corrected. For this purpose, the changeover unit 24 is changed over by means of the test circuit 23 formed by a switching pulse generator into the second position indicated by the broken lines, so that via the control-device 16 the code 0010 is written in the elements of the shift register 18. At the same time, the switching pulse generator in test circuit 23 closes the switch 26 of the correction device 25 and the correction voltage source 27 is connected to the input of the analogue-digital converter 13, which is thus changed over from its position 100 to the position 101. Thus correction device 25 is a standard fixed voltage source 27 connected to a electrically controlled switch 26 such as the type shown in FIG. 1 of U.S. Pat. No. 3,478,170 and merely adds a fixed voltage equivalent to a binary 1 of analog-to-digital converter 13 to the input of this analog-to-digital converter.

The resultant code groups 0010 and 101 of the first and the second analogue-digital converters 9 and 13 respectively are thus transmitted in order of succession. The code groups are exactly equal to the transmitted code groups in the event of a correct adjustment of the pulse code modulation transmitter described.

In contrast to the prior art pulse code modulation transmitter of the type set forth, in which for the transmission of the correct code groups the adjustment of the dynamic control 12 requires high accuracy, a different method is employed for the transmission of the correct code groups by the pulse code modulation transmitter embodying the invention, in which the transmitted code groups are corrected with the aid of a first analogue-digital converter 9 having an enlarged coding rnage by means of a test circuit 23, which tests the pulse of the highest weight, and with the aid of a correction device 24, 25 coupled with the first and with the second analogue-digital converters 9 and 13 respectively. Whereas the known arrangement requires an adjustment accuracy for the dynamic control 12 of the order of magnitude of 1 coding unit, which corresponds to an accuracy of $1/2048 = ½^{11}$, this requirement of accuracy is substantially reduced by applying the novel design to the arrangement embodying the invention, since it is of the order of magnitude of the amplitude range of one segment of the segment-shaped control curve, which corresponds to 16 coding units. By using this measure, the striking effect is that the requirement of accuracy is reduced by a factor $2^4$.

Owing to the surprising reduction of the requirements of accuracy, the tolerance requirements of the elements of the pulse code modulation transmitter according to the invention, are extremely small, while said elements may be constructed for the major part in accordance with digital technology. The pulse code modulation transmitter may advantageously be used in an integrated semiconductor body.

Figure 3:
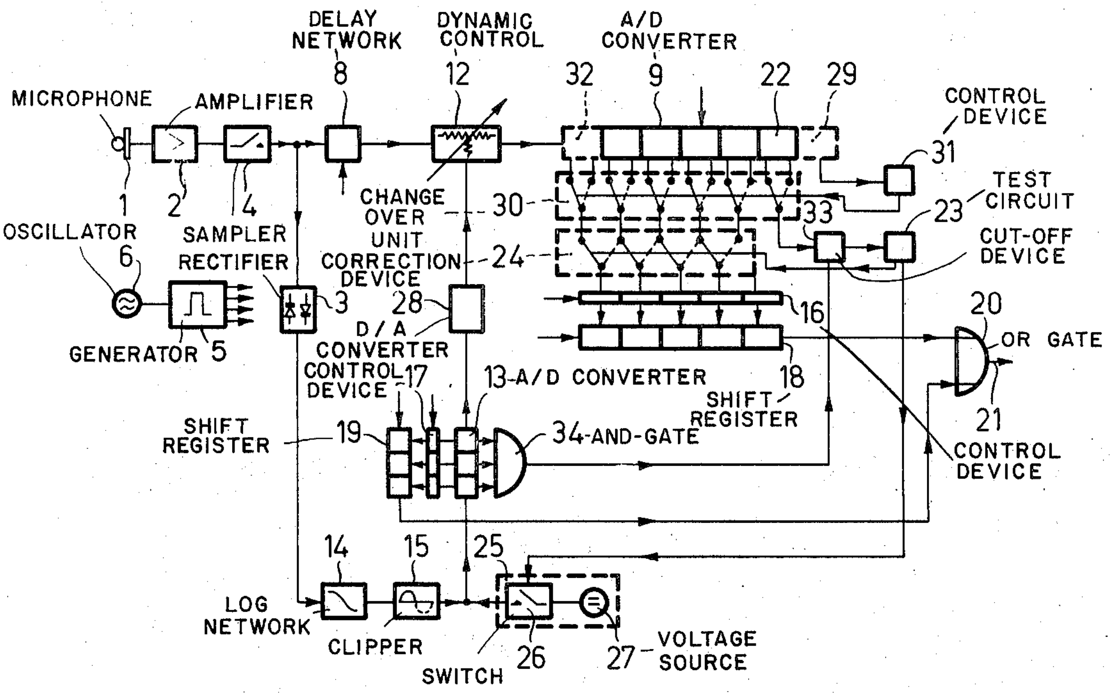
FIG. 3 is the block diagram of a variant of the transmitter shown in FIG. 1.

FIG. 3 shows a second embodiment of a pulse code modulation transmitter in accordance with the invention, which differs in two ways from the transmitter shown in FIG. 1. One way is in the production of the polarity pulse, and the other way in the structure of the correction of the code groups produced by the first and the second analogue-digital converters. Elements corresponding with those of FIG. 1 are designated in FIG. 3 by the same reference numerals.

In this arrangement, samples of the speech signal to be transmitted are applied without prior rectification through the dynamic control 12 to the first analogue-digital converter 9, which comprises an additional element 29 for assessing the positive or negative polarity of the sample concerned. If the sample has positive or negative polarity, the respective logical value 1 or 0 will appear in the additional element 29 of the analogue-digital converter 9, said value being written as a polarity pulse through the control-device 16 in an additional element 18a of the shift register 18. (not shown in the Figure).

In order to transmit in a conventional manner, the coded amplitude value by the polarity pulse, the elements of the analogue-digital converter 9 are provided with relatively complementary outputs, a change-over unit 30 for changing over between the complementary outputs of the elements of the analogue-digital converter 9 and a change-over control-device 31, which is connected to the additional element 29 of the analogue-digital converter 9. Obviously, change-over unit 30 may be formed in exactly the same manner as correction device 24, that is, as an analog equivalent of a multiple pole double throw switch. Obviously change-over control device 31 operates in almost the identical manner as test circuit 23, with the exception of the fact that only one output of a flip-flop inside change-over control device 31 is used. As with test circuit 23 a reset input for the flip-flop in change-over control unit 31 from control pulse generator 5 is not shown. If, for example, at the input of the analogue-digital converter 9 a sample of positive polarity and of an amplitude value 30 appears, the complementary code groups 0111 and 1000 appear at the complementary outputs of the elements of the analogue-digital converter 9 and the logical value 1 appears in the additional element 29 and is written as a polarity pulse in the code group 0111 at the outputs of the elements of the analogue-digital converter 9 via the control-device 16 in the elements of the shift register 18. If a sample of negative polarity and of the same amplitude value 30 appears at the input of the analogue-digital converter 9, the complementary code groups 1000 and 0111 are formed at the complementary outputs of the elements of the analogue-digital converter 9 and the logical value 0 appears in the additional element 29 of the analogue-digital converter 9, said logical value 0 producing through the change-over control-device or flip-flop 31, a change-over of the change-over unit 30. In this case, the logical value 0 in the additional element 29 and exactly the same code group 0111 as with positive polarity of the sample are written via the control-device 16 in the elements of the shift register 18.

Without prior rectification, a characterization of the polarity of the sample is thus obtained, which results in the important advantage that direct adjusting voltages, leakage currents and the like have no influence.

In this arrangement, the dynamic control 12 is governed in precisely the same manner as explained with reference to FIG. 1. Subsequent to sampling in the sampling device 4, the speech signal amplified in the amplifier 2 is applied through the full-wave rectifier 3, the network 14 of logarithmic characteristic curve and the threshold device 15 to the analogue-digital converter 13 and with the aid of a digital-converter 28 the dynamic control-voltage is produced for the adjustment of the dynamic control 12. By means of a suitable structure of the dynamic control-circuit, it is ensured that the attenuation code can be only too high so that instead of an attenuation code of, for example, 101, the attenuation code 110 is produced, which corresponds to an attenuation of $2^5$ instead of $2^4$.

In this arrangement, the coding range of the first analogue-digital converter 9 is enlarged by the additional element 32, indicated by broken lines, and located adjacent the pulses of the lowest weight. Also, in this case, the pulse of the highest weight is tested by connecting the test circuit 23 to the element 22 of the analogue-digital converter 9, while the correction devices 24, 25 coupled with the analogue-digital converters 9 and 13 are constructed in the same manner as in the arrangement of FIG. 1. It should be understood that at the closure of the switch 26 of the correction device 25 the code of the analogue-digital converter 13 is reduced by one coding unit by the correction voltage.

The operation of the arrangement described in the foregoing is completely similar to that of the arrangement described with reference to FIG. 1, but for the sake of completeness it will be dealt with hereinafter.

If a sample of positive polarity and of an amplitude value of 480 is applied to the arrangement described, the attenuation code 101 will be produced at the correct coding in the analogue-digital converter 13 (cf. the Table) and the attenuation of the dynamic control 12 will be adjusted to $2^4$ so that at the output of the dynamic control 12 an amplitude value of $480/2^4 = 30$ will occur in the correct amplitude range of 16 to 32.

In the successive elements of the analogue-digital converter 9, the amplitude value 30 is converted into the logical value 001111, while the logical value 1 in the element 22 indicates that the output signal of the dynamic control 12 lies in the correct amplitude range of 16 to 32 so that the arrangement is adjusted correctly. In this state, in which the element 22 of the analogue-digital converter 9 carries a 1, no correction occurs. The logical values of the elements of the first analogue-digital converter 9 and the polarity pulse are written via the control-device 16 in the elements of the shift register 18 and the logical values of the second analogue-digital converter 13 are written through the control-device 17 in the elements of the shift register 19, after which the code groups written in the shift registers 18 and 19 are transmitted one after the other under the control of the control-pulse generator 5. Thus, with the amplitude value 480 the code 101 written in the shift register 19 and the code 0111 written in the shift register 18 together with the polarity pulse are transmitted one after the other.

Starting again from an incoming amplitude value 480, but now from a state in which the analogue-digital converter 13 produces the incorrect attenuation code 110, the attenuation of the dynamic control 12 will be adjusted to $2^5$ and an amplitude value $480/2^5 = 15$ lying beyond the correct amplitude range of 16 to 32 will appear at the output of the dynamic control 12, which value is exactly twice as low as in the correct adjustment of the attenuation of the dynamic control 12. In the consecutive elements of the analogue-digital converter 9, the amplitude value 15 produces the code group 011110.

Owing to the appearance of the logical value 0 of the pulse of the highest amplitude weight in the element 22 of the analogue-digital converter 9, it is determined that the pulse code modulation transmitter is tuned incorrectly, whereas shifted by one element the same code is produced in the analogue-digital converter 9 as in correct adjustment of the pulse code modulation transmitter. In the latter case, the code formed in the elements of the analogue-digital converter 9 is yet 001111.

In this state, the code groups formed in the first and in the second analogue-digital converters 9 and 13 respectively are corrected. The change-over unit 24 is changed over to its second position with the aid of the switching pulse generator 23 so that by way of the control-device 16 the code 0111 is written in the elements of the shift register 18, whereas hand the switching pulse generator 23 closes the switch 26 of the correction device 25 and the analogue-digital converter 13 is changed over from the position 110 to the position 101. In the manner described with reference to FIG. 1, the code groups 0111 of the first analogue-digital converter 9 and the code group 101 of the second analogue-digital converter 13 are transmitted in order of succession; these code groups are exactly equal to the transmitted code groups with the correct adjustment of the pulse code modulation transmitter described.

In this pulse code modulation transmitter, in which the appearance of the logical value 0 in the element 22 of the analogue-digital converter 9 constitutes the criterion for the incorrect adjustment, ambiguity occurs, since with a correct adjustment also the logical value 0 will appear in the element 22 of the analogue-digital converter 9, when the amplitude value lies in the amplitude range of 0 to 16 of the segment A of the segment-shaped control characteristic curve, which segment is characterized by the attenuation code 000. In order to avoid correction of the transmitted code groups with this attenuation code 000, the test circuit 23 has to be put out of operation. For this purpose, a cut-off device or inhibit gate 33 is connected in cascade with the test circuit 23 and is controlled by a selection gate, formed by an and-gate 34, connected to complementary outputs of the analogue-digital converter 13.

At the appearance of the attenuation code 000, the and-gate 34 provides an output pulse which cuts off the test circuit 23 through the cut-off device 33, so that in this case no correction of the code groups produced by the analogue-digital converters 9 and 13 occurs. With all additional attenuation codes, the and-gate 34 does not provide an output pulse so that the test circuit 23 is not cut off, the code groups produced by the analogue-digital converters 9 and 13 being thus corrected in the manner described above. In this simple manner, the aforesaid ambiguity is avoided.

From the foregoing description, it will be apparent that the correction of the code groups may be obtained in such an embodiment of the dynamic control-circuit 12 that the resultant attenuation code is too high or too low. This condition does not apply, however, to the construction of the dynamic control-circuit 12; a dynamic control-circuit 12 may alternatively be used, with which it cannot be predicted whether the resultant attenuation code will be too high or too low, in which case the correction devices shown in FIGS. 1 and 3 have to be used in conjunction. However, with a view to saving of apparatus the construction of FIG. 1 is preferred.

Figure 4:
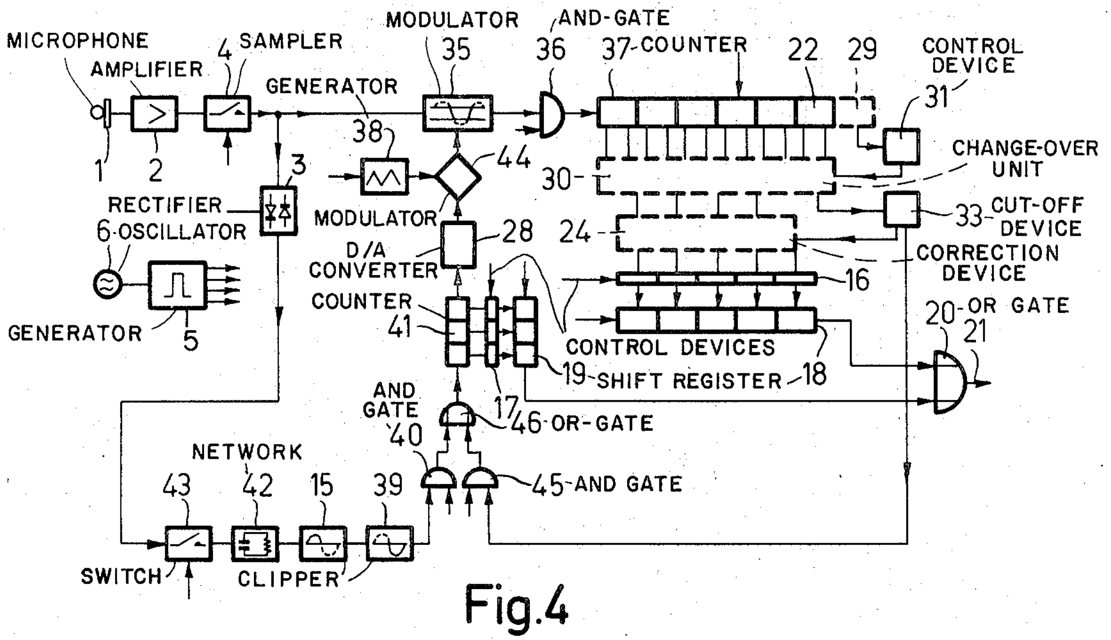
FIG. 4 shows in further detail an embodiment of the transmitter in accordance with the invention.

For practical purposes the embodiment shown in detail in FIG. 4 thus appears to be particularly advantageous. Elements corresponding with those of FIGS. 1 and 3 are designated in FIG. 4 by the same reference numerals.

In this embodiment, the first analogue-digital converter is formed by the cascade connection of a pulse duration modulator 35, a selection gate formed by an and-gate 36, which is simultaneously fed by counting pulses from the control-pulse generator 5 for producing a number of pulses corresponding to the duration of the pulses from the pulse-duration modulator 35, and a subsequent binary counter 37. The binary counter 37 may be formed by the cascade connection of a number of bistable relaxation generators.

In the embodiment shown, the samples of the sampling device 4 are applied to the pulse duration modulator 35 of the first analogue-digital converter, which furthermore receives a sawtooth signal from a sawtooth generator 38 synchronized by the control-pulses of the control-pulse generator 5 and via the and-gate 36 the binary counter 37 produces the desired code groups. Herein the pulse duration modulator 35 performs the function of the dynamic control 12, which will be explained more fully hereinafter.

In the same manner as described with reference to FIG. 3 the samples of the sampling device 4 are applied without previous rectification to the first analogue-digital converter and the polarity pulse is derived from the last element 29 of the binary counter 37.

Like the first analogue-digital converter the second analogue-digital converter is formed by a pulse duration modulator, a selection gate formed by an and-gate 40 and a binary counter 41, the and-gate 40 receiving counting pulses from the control-pulse generator 5. In the same manner as described with reference to FIG. 3, the samples of the sampling device 4 are applied through the full-wave rectifier 3 and a network 42 to be described hereinafter to a clipper 15, adjusted to an appropriate value and forming together with a subsequent clipper 39 the pulse duration modulator. As in the embodiment of FIG. 1, the compression of the pulse duration modulator operating as a dynamic control is too late.

In the embodiment shown, the network 42 is formed by the parallel combination of a capacitor and a resistor, having a suitably chosen time constant, and there is a preceding separate sampling device 43, which is controlled by control-pulses from the control-pulse generator 5. The code group produced in the binary counter 41 characterizes the segment concerned of the segment-shaped control curve. If, for example, the network 42 receives a sample rectified in the full-wave rectifier 4, the voltage across the network 42 will discharge according to the exponent of E and will intersect the threshold voltage of the threshold device 15 after a period of time proportional to the logarithm of the value of the applied signal voltage so that the duration of the pulses produced in the pulse duration modulator 15, 39 also varies with the logarithm of the applied signal voltage and the code group produced in the binary counter 41 characterizes the segment concerned of the segment-shaped control curve.

In the manner described above, the code group produced in the binary counter 41 is applied to obtain and coupled the dynamic control-voltage, to the digitalanalogue converter 28, which may be particularly simple. The digital-analogue converter 28 is formed by damping networks connected to the elements of the binary counter 41 and a combination device connected to the damping networks, the dynamic control-voltage being derived therefrom at an appropriate proportioning of the damping networks for governing the dynamic control, which is formed, as stated above, by the pulse duration modulator 35. For this purpose the pulse duration modulator 35 receives the sawtooth voltage from the sawtooth generator 38 through an amplitude modulator 44, which is governed by the dynamic control-voltage. If, for example, the dynamic control-voltage increases by a factor 2, the amplitude of the sawtooth voltage will increase by a factor 2 and the duration of the pulses produced by the pulse duration modulator 35 will decrease by a factor 2 so that the desired compression is obtained.

As described with reference to FIG. 3, the polarity pulses are derived from the element 29 of the binary counter 37 and the correction of the code groups produced by the first and the second analogue-digital converters is performed through the test circuit 23, connected to the element 22. The correction of the code group produced by the first analogue-digital converter is performed by means of the change-over unit 24 and that of the code group from the second analogue-digital converter is performed by means of the selection gate 45, which also receives control-pulses from the control-pulse generator 5. An incorrect adjustment of the pulse code modulation transmitter is assessed by the switching pulse generator 23, which then applies a pulse to the and-gate 45, which corrects the code group produced by the binary counter 41 through the or-gate 46.

Owing to the correction of the resultant code groups in accordance with the invention by means of the test circuit 23, no particular requirements have to be imposed on the accuracy of the apparatus employed, for example, with respect to adjustments, tolerances and the like. In the embodiment shown in FIG. 4 it has even been found to be possible to construct substantially the whole apparatus according to the digital technique, since inaccuracies, if any, are corrected by the correction process.

What is claimed is:

1. A transmitter for the transmission of an analog signal by pulse code modulation, said transmitter comprising a dynamic control for dynamic compression, said dynamic control having segmented-shaped control characteristic curve and being governed by the instantaneous value of the analog signal, a first analog to digital converter for converting amplitude values on an analog signal with a given coding range into code groups having a plurality of pulses of different weights, said first analog to digital converter comprising a first shift register, menas to couple the analog signal to the dynamic control, means to couple the dynamic control to the first analog to digital converter, a second analog to digital converter for generating a code group corresponding to the segment of the segmented-shaped control characteristic curve operative with respect to the input analog signal to the dynamic control, said second analog to digital converter comprising a second shift register, the code groups from the first and the second analog to digital converters being for a common transmission, a test circuit for testing the first shift register for the pulse of the highest weight in the code group therein, a first correction device coupled to the first analog to digital converter and controlled the test circuit for correcting the code groups therefrom, and a second correction device coupled to the second analog to digital converter and controlled by the test circuit for correcting the code groups therefrom.

2. A transmitter as claimed in 1, wherein the test circuit comprises a switching pulse generator which controls the first and the second correction devices.

3. A transmitter as claimed in claim 1, wherein the first correction device comprises a change-over unit having two positions, the switch of the change-over unit being connected in the first position of the output of elements of the first shift register and in the second position to the elements of the first shift register shifted over by one element.

4. A transmitter as claimed in claim 1, wherein the second correction device comprises a cascade circuit of a correction voltage source and a switch controlled by the test circuit.

5. A transmitter as claimed in claim 1, wherein the second correction device comprises a selection gate controlled by the test circuit and pulses from a control pulse generator.

6. A transmitter as claimed in claim 1, wherein the second analog to digital converter can only produce a code which can only have an error in a given direction, said second analog to digital converter comprising selection gates coupled respectively to the elements of the second shift register, each of said selection gates supplying a cut-off voltage for a code wherein a given logic value appears at each of the elements of the second shift register, said cut-off voltage blocking a cut-off device connected in cascade with said test circuit.

7. A transmitter as claimed in claim 1, wherein the first shift register includes an additional element for producing a polarity pulse and wherein a change-over control device is connected to the additional element for producing a polarity pulse, said change-over control device including a change-over unit which is responsive to the logic value of other elements of the first shift register.

8. A transmitter as claimed in claim 1, wherein the output signal of the second analog to digital converter is coupled to a digital to analog converter which supplies a dynamic control voltage for the dynamic control.

9. A transmitter as claimed in claim 8, wherein the first analog to digital converter comprises a pulse duration modulator, a saw-tooth generator for generating a sawtooth voltage for controlling the pulse duration modulator, an amplitude modulator coupled to the saw-tooth generator, means to couple the dynamic control voltage to the amplitude modulator, and a binary counting device coupled to the pulse duration modulator.

* * * * *

0-105J
5/69)

UNITED STATES PATENT OFFICE

CERTIFICATE OF CORRECTION atent No. 3,823,376 Dated July 9, 1974 nventor(s) JOHANNES ANTON GREEFKES and GEERLOF JAN KOREVAAR

It is certified that error appears in the above-identified patent ınd that said Letters Patent are hereby corrected as shown below:

ON THE TITLE PAGE

In the title, after "PULSE CODE" insert --MODULATION--;

Section [75] Inventors "Jan Korevaar Geerlof" should read

--Geerlof Jan Korevaar--;

IN THE SPECIFICATION

Col. 2, lines 33 and 34 should read --values 0 and 1. Analog-digital converter 9 includes a shift register for temporarily storing codes. With each code--;

Col. 3, line 31, "$V^u$" should read --$V_u$--;

line 49, "Of" should read --of--;

Col. 5, line 14, "The correction" should be --Correction--;

line 16, "switch correction" should be --switch. The correction--;

PO-1050
(5/69)

UNITED STATES PATENT OFFICE
CERTIFICATE OF CORRECTION

Patent No. 3,823,376 Dated July 9, 1974

Inventor(s) JOHANNES ANTON GREEFKES and GEERLOF JAN KOREVAAR

It is certified that error appears in the above-identified patent and that said Letters Patent are hereby corrected as shown below:

Col. 5, line 38, "$2_4$" should read --$2^4$--;

Col. 5, line 44, should be a continuation of line 43 and not a new paragraph;

Col. 7, line 5, "rnage" should be --range--;

line 47, cancel "(not shown in the";

line 48, cancel in its entirety

Col. 11, line 33, cancel "and";

line 34, cancel "coupled" ; after "voltage" cancel " , " and insert --and coupled--;

"digitalana-" should be --digital-ana- --;

<u>IN THE CLAIMS</u>

Claim 1, line 8, "with" should be --within--;

Signed and sealed this 10th day of June 1975.

(SEAL)
Attest:

RUTH C. MASON
Attesting Officer

C. MARSHALL DANN
Commissioner of Patents
and Trademarks